United States Patent [19]
Kimura et al.

[11] Patent Number: 5,641,128
[45] Date of Patent: Jun. 24, 1997

[54] METHOD OF AND APPARATUS FOR RECOVERING FOAMING GAS OF THE FOAMED MATERIAL

[75] Inventors: Nobuo Kimura, Kudamatsu; Masakatsu Hayashi, Ushiku; Chikao Oda, Kudamatsu; Kazuo Sakaguchi, Kudamatsu; Yoshiyuki Takamura, Kudamatsu; Kichiji Uchiyama, Kudamatsu; Kazuo Makino, Kudamatsu; Noritaka Terayama, Kudamatsu, all of Japan

[73] Assignee: Hitachi, Ltd., Tokyo, Japan

[21] Appl. No.: 250,777

[22] Filed: May 27, 1994

Related U.S. Application Data

[63] Continuation-in-part of Ser. No. 85,092, Jul. 2, 1993, Pat. No. 5,431,347, which is a continuation-in-part of Ser. No. 56,937, May 5, 1993, Pat. No. 5,301,881, which is a continuation of Ser. No. 984,492, Dec. 2, 1992, abandoned.

[30] Foreign Application Priority Data

| Dec. 2, 1991 | [JP] | Japan | 3-317643 |
| Jan. 29, 1993 | [JP] | Japan | 5-013385 |
| May 27, 1993 | [JP] | Japan | 5-125670 |
| Dec. 28, 1993 | [JP] | Japan | 5-334960 |
| Feb. 24, 1994 | [JP] | Japan | 6-026461 |
| Feb. 24, 1994 | [JP] | Japan | 6-026464 |

[51] Int. Cl.$^6$ .................. B02C 7/00; B02C 23/10
[52] U.S. Cl. .................. 241/63; 241/DIG. 38; 241/24.18
[58] Field of Search .................. 241/19, 24, 29, 241/78, 79.1, 157, DIG. 14, DIG. 38, 242, 63

[56] References Cited

U.S. PATENT DOCUMENTS

| 3,561,685 | 2/1971 | Feder | 241/242 |
| 5,042,724 | 8/1991 | Perry | 241/DIG. 14 |
| 5,042,725 | 8/1991 | Grimmer | 241/19 |
| 5,297,741 | 3/1994 | Zurn et al. | 241/DIG. 38 |

*Primary Examiner*—Douglas D. Watts
*Attorney, Agent, or Firm*—Evenson McKeown Edwards & Lenahan, PLLC

[57] ABSTRACT

A system including a method and an apparatus is disclosed for effectively separating a foamed heat-insulating material, such as insulated wall sections from used refrigeration equipment, into a foaming gas and a heat-insulating resin without any alteration and recovering them. A peeling portion for peeling a foamed heat-insulating material from a composite material containing the foamed heat-insulating material is included in a crusher provided with a high speed rotor having a plurality of hammers and a casing surrounding the rotor. A sorting portion is provided for sorting the foamed heat-insulating material with a tilting type wind force sorter having a limited tilting angle and a limited height of a wind tunnel. A pulverizing portion is provided for pulverizing the sorted foamed heat-insulating material and for separating a foaming gas therefrom. A condensing portion is provided for cooling and liquefying the separated foaming gas. A compressor is provided for compressing the pulverized non-foaming gas portions of the heat-insulating material for reducing the volume thereof. These recovery steps are accomplished without permitting escape of the foaming gas to the outside of the system.

43 Claims, 8 Drawing Sheets

METHOD OF AND APPARATUS FOR RECOVERING FOAMING GAS OF THE FOAMED MATERIAL

CROSS-REFERENCE TO RELATED APPLICATION

This application is a continuation-in-part application of application Ser. No. 08/085,092 filed on Jul. 2, 1993, now U.S. Pat. No. 5,431,347 the contents of which are incorporated herein by reference in their entirety, which is a continuation-in-part application of application Ser. No. 08/056,937 filed on May 5, 1993 now U.S. Pat. No. 5,301,881, which is a continuation application of application Ser. No. 07/984,492 filed on Dec. 2, 1992 now abandoned.

FIELD OF THE INVENTION

The present invention relates to a method of and an apparatus for disposing of unnecessary foamed material used in a refrigerator or the like, and particularly to a method of and an apparatus for recovering a foaming agent from the above-mentioned foamed heat-insulating material by degassing of the foaming agent.

BACKGROUND AND SUMMARY OF THE INVENTION

Conventionally, foamed heat-insulating materials to be discarded have been roughly crushed, and buried under the ground or thrown into fire together with other refuse material. In recent years, for environmental protection and resource recovery purposes, investigations have been made into the possibilities for recovering the foaming agents from such foamed material.

It is disclosed in German Patent Document DE 4,016,512 A1, for example, to recovery foaming agents from hard polyurethane foams. In this method, a hard polyurethane foam material is roughly crushed by a crusher and compressed by a cylinder press or the like. A foaming gas is thus discharged from the heat-insulating material, and is absorbed and degassed by an active carbon or the like, to be thus recovered.

However, as a result of experiments made by the present inventors, a hard polyurethane foam heat-insulating material in a volume of 50 mm cubic could not be degassed even by applying of a load of about 5 metric ton (pressure of about 5 metric ton per 25 cm²). The degassing was thus judged to be practically difficult by a simple compression. The reason for this is that the strength of hard polyurethane foams has been extremely increased in recent years by the enhancement in the quality of resin and the improvement in the manufacturing techniques. Accordingly, it is difficult to degas at the same level by only the compression, both refuse matters generated several decades ago and those generated using the recently adopted manufacturing processes.

The present invention covers the whole recovery system, and is made to solve problems throughout all processes including a pre-treatment process of taking off a foamed heat-insulating material from a refrigerator, a process of degassing a foaming gas, and a post-treatment process for the degassed foamed heat-insulating material. In the pre-treatment process, it is intended to effectively and substantially perfectly peel a foamed heat-insulating material adhered to steel plates and/or plastic material plates constituting a refrigerator using an apparatus improved in labor saving, and to then sort only the peeled foamed heat-insulating material. In the degassing process, it is intended to perfectly degas the foaming gas. Moreover, in the post-treatment process, it is intended to reduce the volume of the fine powder of the resin constituting the foamed heat-insulating material for facilitating subsequent transportation or the like.

The degassing process is more fully described as follows. To degas a foaming gas from a foamed heat-insulating material formed of independent foams, the foam film must be destroyed. The destruction of the foam film by compression requires a high load, as described above. For weakening the destruction strength of the foam film, it is considered to heat the resin of the heat insulating material, however, the heat-insulating material itself has a heat-insulating effect essentially and is difficult to be uniformly heated, which causes the fear that the forming gas is thermally decomposed. On the other hand, it may be considered to cool the foamed heat-insulating material at low temperatures for avoiding the thermal decomposition for making brittle the heat-insulating material; however, the heat-insulating material has a function as a cold insulator essentially, and is difficult to be uniformly cooled.

It is an object of the present invention to provide a method of and apparatus for recovering a foaming gas capable of enhancing a recovery ratio of a foaming gas.

It is another object to provide a system including a method of and apparatus for recovering foaming gas with labor-saving throughout the whole system According to the present invention, there is provided a crusher supplied with a fragment having foamed material stuck on another material. The crusher peels the foamed material from the other material (e.g., steel plates or plastic plates) of said fragment and forms a mixture of crushed materials containing crushed foamed material and crushed other material. A separator is supplied with said mixture for separating said crushed foamed material from the other crushed material. A recovering device supplied with said crushed foamed material from said separator recovers a foaming agent from said crushed foamed material.

Preferred embodiments of the crusher include a high speed rotor having a plurality of hammers, and a casing having an irregular inner wall surface wherein the foamed heat-insulating material is impact-crushed and grounded.

Preferred embodiments of the separator include a tilting type wind force sorting unit with wind force conveying of the foamed material to an upper conveyor outlet opening while the other solid materials are conveyed downwardly by gravity along a tilting bottom surface of the conveyor unit to a lower conveyor outlet opening. The bottom tilted surface of the wind tunnel section of the sorting unit is inclined at an angle greater than an angle of repose based on the coefficients of friction of the bottom tilted surface and the metal or plastic plates forming the solid material of the mixture. Thus, the plastic or metal slides downwardly under the force of gravity against the upwardly flowing wind force which conveys the foamed material upwardly thereby separating the foamed material from the metal and/or plastic plates.

The recovering device preferably includes a pulverizing device for exerting an external force to the foamed heat-insulating material for destroying independent foams in the foamed heat-insulating material, thereby separating the foamed heat-insulating material into a resin component and a foaming gas within the foam. The recovering device also includes a condensing device for cooling and liquefying the separated foaming gas. A compressor is provided which includes a cylinder having an opening portion of a side surface, a main drive piston with a straight barrel portion having a length longer than that of the opening portion in the axial direction of the cylinder, and a driven piston with a straight barrel portion having a length shorter than that of the main drive piston, the main drive piston and the drive piston being disposed on both the sides of the cylinder while holding the opening portion therebetween, wherein a fine powder of the resin component of the foamed heat-insulating material charged from the opening portion is compressed by movement of the main drive piston on the drive piston side, and at the same time the opening portion of the cylinder is closed by the straight barrel portion of the moved main drive piston, and the compressed fine powder is discharged from the end surface of the cylinder on the driven piston side by movement of the main drive piston and the drive piston on the driven piston side.

A foamed heat-insulating material adhered to plastic or metal material is put in the crusher, and is impactcrushed and ground between a crusher rotor and a crusher casing, thereby peeling the foamed material from the plastic or metal. The mixture of the peeled foamed heat-insulating material and the plastic or metal is then supplied to the tilting type wind force sorter. In this sorter, the planar plastic or metal is slid along the bottom plate of the wind tunnel. The planar plastic or metal pieces are orientated substantially flat and parallel to the wind direction, as a result of which the resistance of the plastic or metal against the wind is significantly reduced. Thus, in terms of the ease of the flying against the wind, a large difference is generated between the plastic or metal and the foamed heat-insulating material. This makes it possible to sort out only the foamed heat-insulating material with a high accuracy. The sorted foamed heat-insulating material is then applied with an external force to destroy individual foams in the foamed heat-insulating material. Accordingly, it is possible to substantially perfectly degas the foaming gas. On the other hand, the fine powder of the pulverized foamed heat-insulating material is charged in the cylinder under the pulverizing portion by the deadweight, and is then compressed and discharged while discharging the foaming gas remaining in the fine powder on the pulverizing portion side.

Other objects, advantages and novel features of the present invention will become apparent from the following detailed description of the invention when considered in conjunction with the accompanying drawings.

DETAILED DESCRIPTION OF THE PREFERRED EMBODIMENTS

Hereinafter, one embodiment of the present invention will be described with reference to FIGS. 1 to 12.

Figure 1:
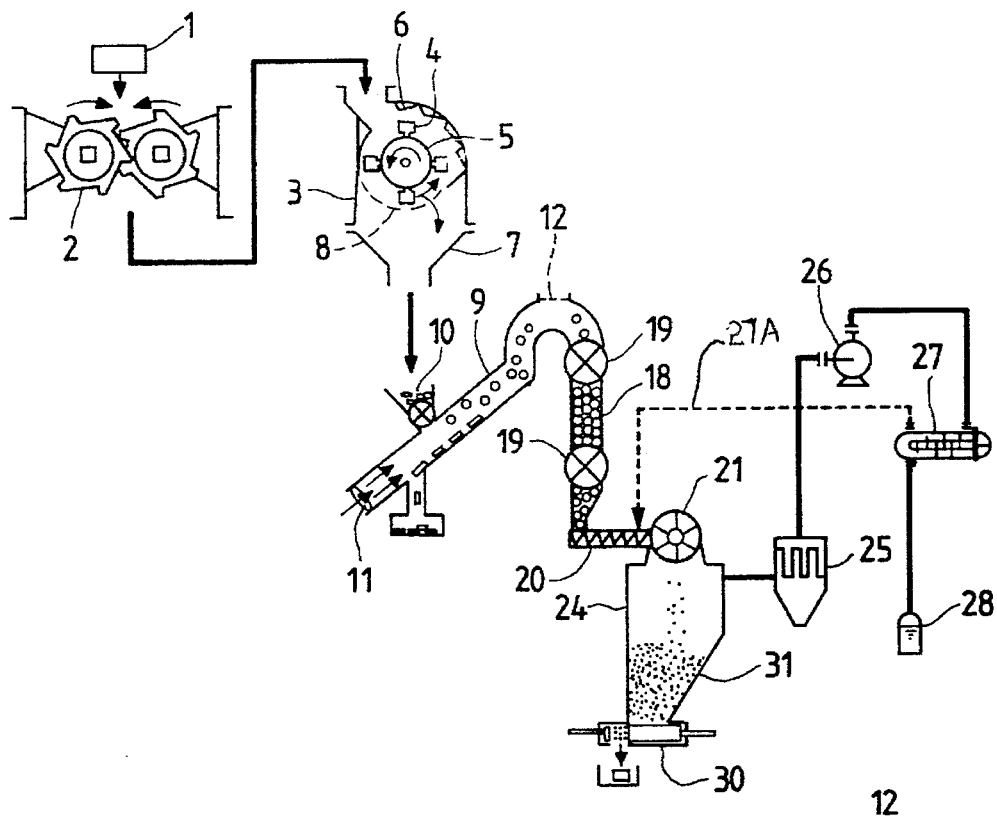
FIG. 1 is a schematic illustration showing the construction of one embodiment of a recovery system, constructed according to a preferred embodiment of the present invention.

FIG. 1 is a diagram showing the basic concept of a recovery system constructed according to a preferred embodiment of the invention. A refrigerator 1 or the like containing foamed heat-insulating material adhered to solid plastic and/or metal plates is roughly crushed by first crusher 2. The roughly crushed parts are then put in a crusher 3. The crusher 3 includes a rotor 5 rotatable at a high speed and having a plurality of hammers 4, and a casing 6 having an irregular inner wall surface surrounding the rotor 5. A majority of the foamed heat-insulating material before being put in the crusher 3 is stuck or adhered on a plastic material plate, metal plate or the like. This material is held between the rotor 5 and the casing 3 in the crusher 3 while it is impact-crushed and ground, and is peeled from the plastic material and the like. Of the peeled crushed pieces, those having small sizes pass through a grid 8 at a discharge port 7, and are put in an inlet 10 of a wind force sorter 9 in the subsequent process; however, those having large sizes which cannot pass through the grid 8 remain in the crusher 3, and are furthermore peeled from the plastic material or the like. As a result of experiments by the present inventors, 98% or more of the foamed heat-insulating material stuck on the plastic material or the like can be peeled off in such a crusher 3.

Next, the wind force sorter will be fully described with reference to FIG. 2.

The wind force sorter 9 has a structure in which a wind from a blower 11 flows toward a screen 12 by way of a wind tunnel. The mixture is fed to the wind force sorter by inlet 10 and a rotary valve 19 which assures a consistent constant flow of material. A tilting angle 8 of the wind tunnel portion is larger than an angle of repose based on a wall surface friction coefficient of a bottom plate 13 of the wind tunnel portion and a solid part friction coefficient of plastic pieces 14, metal pieces 15 or the like, so as to permit the plastic or metal pieces to slide along the tilting surface under the force of gravity without staying even against a wind flowing upward in the wind tunnel. The plastic pieces or the like are thus slid downward along the tilting surface, and recovered in a plastic/metal recovery box 16. On the other hand, the foamed heat-insulating material pieces 17 moved on the leeward side are fed to the subsequent pulverizing portion. Of the crushed pieces put in the wind force sorter, the majority of the plastic pieces or the like peeled from the foamed heat-insulating material pieces are of planar shapes, and the planar plastic pieces or the like are slid with the planes thereof being directed to be in parallel to the bottom plate 13 of the wind tunnel, so that each of the plastic pieces or the like has a small resistance against the wind flowing upward in the wind tunnel. Thus, in terms of the ease of flying against the wind, a large difference is generated between the bulky foamed heat-insulating material pieces and the plastic pieces. This will be described in comparison with a conventional machine.

Figure 3:
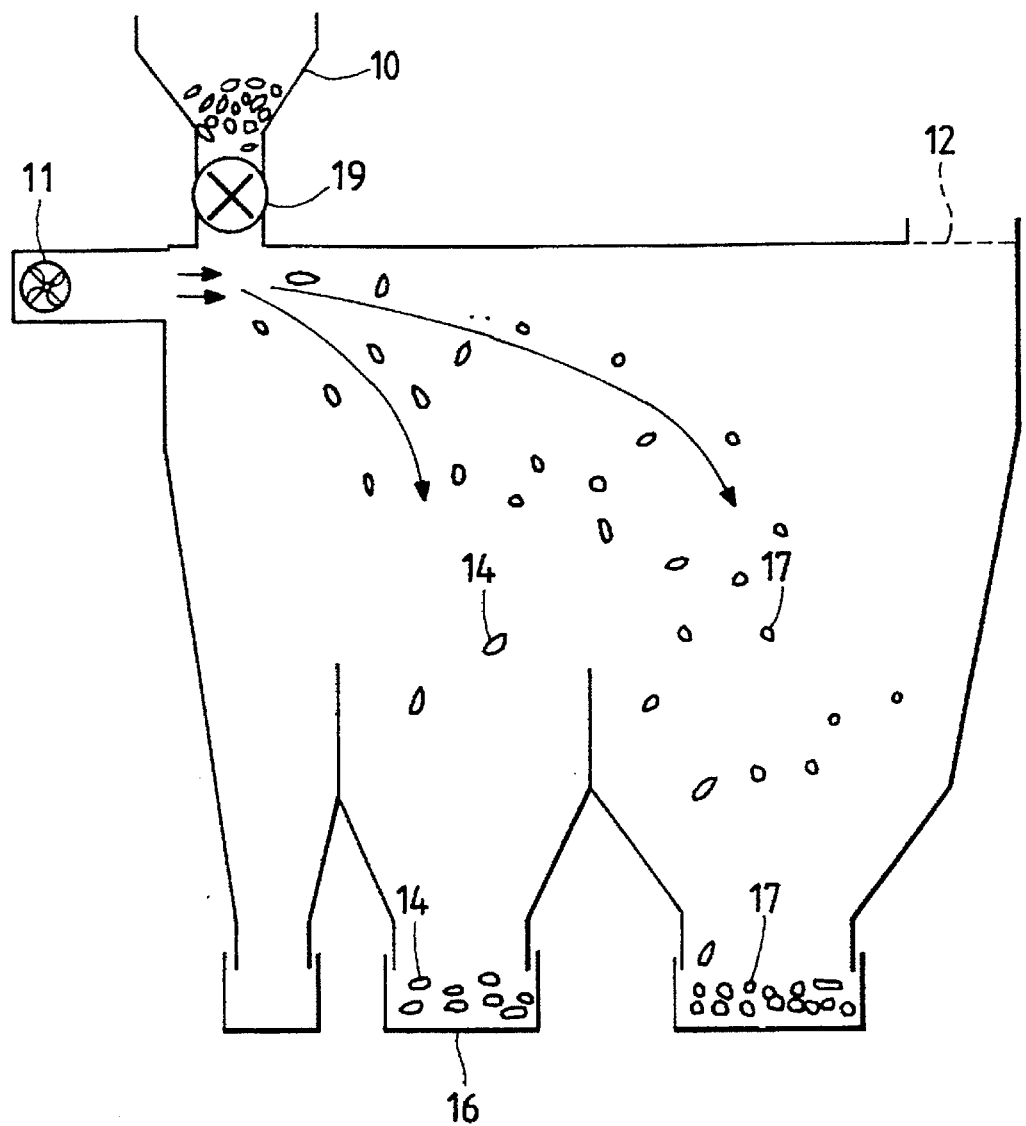
FIG. 3 is a schematic view showing the structure of a conventional wind force sorter.

In the conventional wind sorter, for example, shown in FIG. 3, in the case that the planes of planar plastic pieces or the like are disposed parallel to the wind direction, the planar plastic pieces or the like are difficult to be conveyed by the air current compared with foamed heat-insulating material pieces having a specific gravity smaller than that of the plastic or the like, so that they can be easily sorted from the foamed heat-insulating material pieces. However, in the case that the planes of the planar plastic pieces or the like become perpendicular to the wind direction, the plastic pieces or the like are easily conveyed similarly to the foamed heat-insulating material pieces, and thus the sorting accuracy is substantially impaired.

Figure 2:
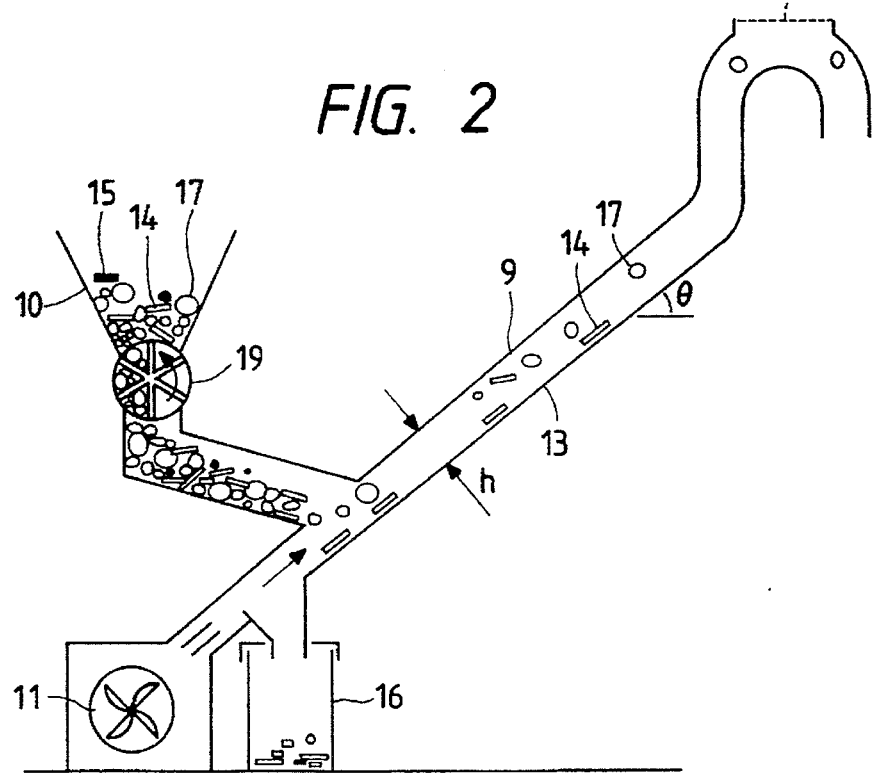
FIG. 2 is an enlarged schematic front view showing details of a wind force sorter shown in FIG. 1.

In contrast to the wind force sorter of FIG. 3, in the wind force sorter of the present invention, as shown in FIG. 2, the planes of the plastic pieces or the like are substantially always in parallel to the wind direction due to their accumulation and sliding on the wind tunnel bottom plate with resultant high sorting accuracy.

Figure 4:
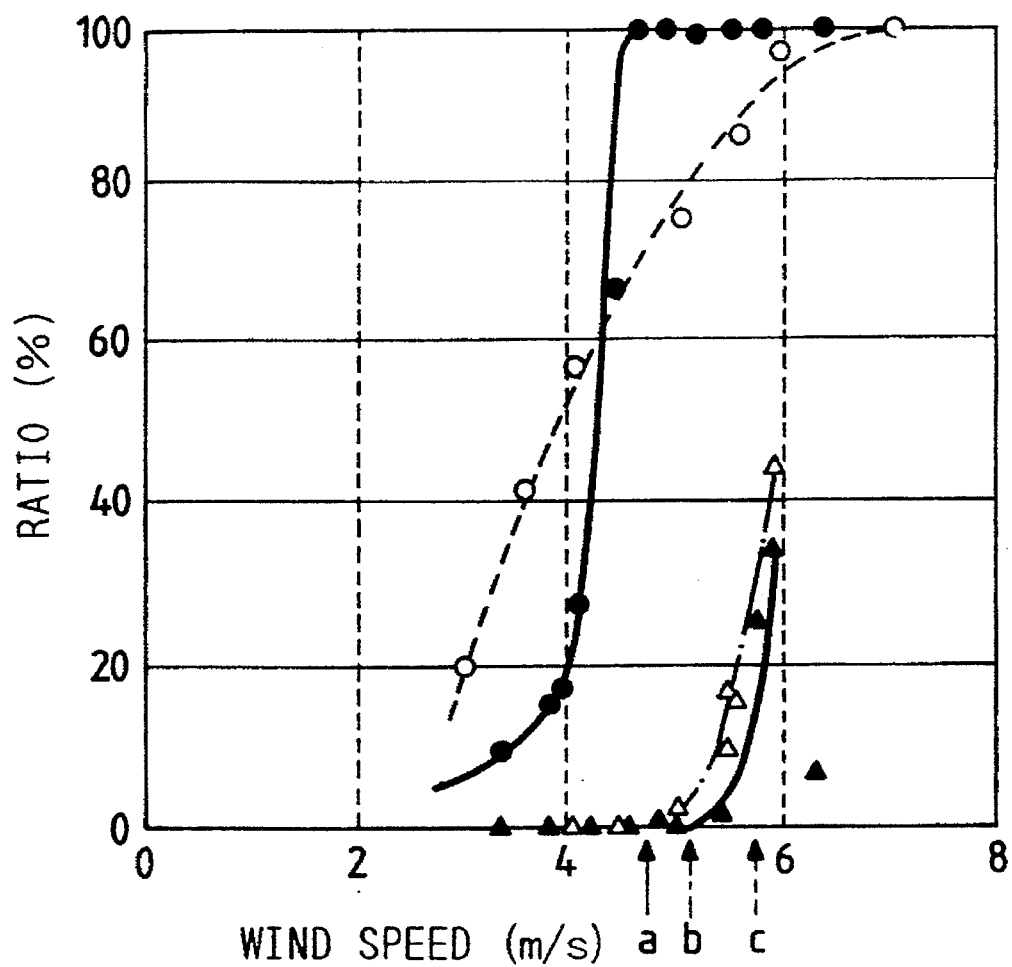
FIG. 4 is a graph comparing the performance of a wind force sorter of the present invention such as shown in FIG. 2 with that of a conventional wind force sorter such as shown in FIG. 3.

FIG. 4 graphically shows the results of experiments which were conducted by the present inventors, for a mixture of crushed pieces of planar plastic and bulky foamed heat-insulating material. This graph shows the recovery ratio, and the mixing ratio of the plastic pieces in the recovered foamed heat-insulating material pieces. In this figure, the black dot and the white dot indicate the recovery ratios of the inventive sorter and the conventional sorter, respectively. Furthermore, the black triangular dot and the white triangular dot indicate the mixing ratios of the inventive sorter and the conventional sorter, respectively. In the wind force sorter of the present invention, the ideal sorting with 100% of the recovery ratio and 0% of the mixing ratio can be achieved at the wind speed (4.8 m/s) shown by the solid line arrow <a>. On the contrary, in the conventional sorter, only the sorting with about 80% of recovery ratio can be achieved at a wind speed (5.1 m/s) shown by the broken line arrow <b>. Furthermore, in the conventional sorter, when the wind speed is increased up to the value shown by the arrow <c> (5.8 m/s) for increasing the recovery ratio, 95% of the recovery ratio can be obtained but the mixing ratio is increased up to about 40%. As a result, in the conventional sorter, a wind speed for satisfying both the recovery ratio and the mixing ratio cannot be found.

The height <h> of the wind tunnel of the sorter (FIG. 2) will be described below.

Along with the increase in the supply amount of the mixture within this sorter, a lot of the plastic pieces tend to be slid along the wind tunnel floor surface, leading to a reduction in the wind speed near the floor surface. As a result, the foamed heat-insulating material pieces flying upward near the floor surface are grounded on the floor surface. The wind speed near the floor surface is thus furthermore reduced. Eventually, the foamed heat-insulating material pieces are slid downward along the floor surface, to be recovered into the plastic recovering portion, thereby reducing the recovery ratio of the foamed heat-insulating material. In this case, since the amount of the wind in the wind tunnel is set to be constant, the reduction in the wind speed near the floor surface increases the wind speed at the central portion of the wind tunnel which is higher than the floor surface. When the height of the wind tunnel is excessively increased with respect to the size of the foamed heat-insulating material pieces, the foamed heat-insulating material pieces are slid downward along the floor surface by the reduced wind speed near the floor surface. However, when the height of the wind tunnel is set to be lower, the foamed heat-insulating material pieces which are intended to be slid downward are moved upward by the wind at the center portion separated from the floor surface of the wind tunnel. This makes it possible to prevent the reduction in the recovery ratio of the foamed heat-insulating material pieces even when the supply amount of the mixture is increased.

Figure 5:
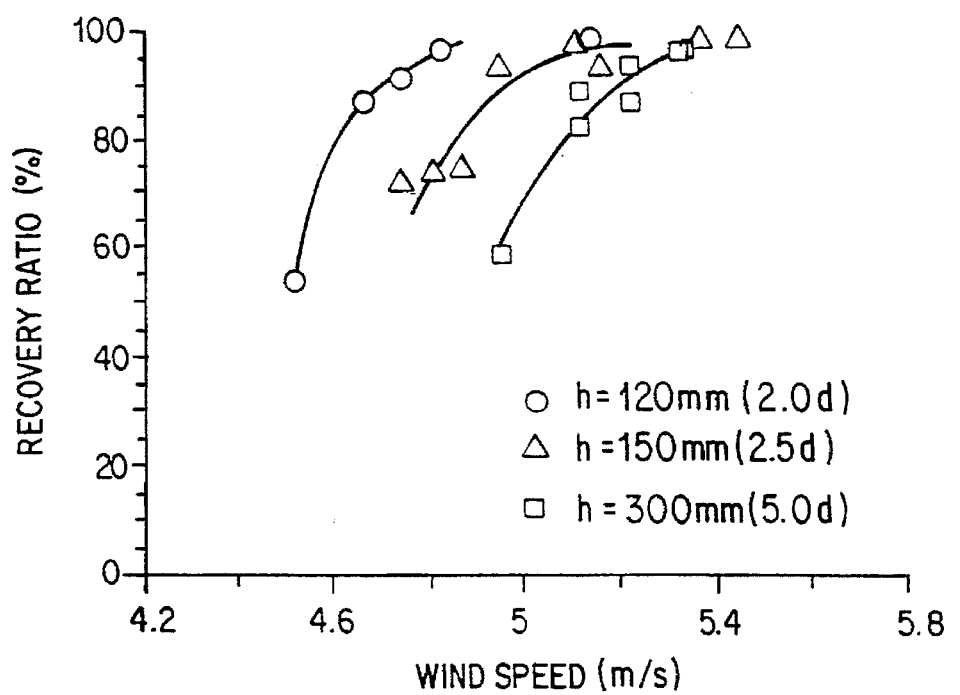
FIG. 5 is a graph explaining the influence of the wind speed and wind tunnel height on the sorting efficiency of a wind force sorter of the present invention.

FIG. 5 shows the recovery ratio affected by the wind speed for the constant processed amount. The wind speed shown by the abscissa is measured at the central portion of the wind tunnel in the height direction (h of FIG. 2) before specimens such as foamed heat-insulating material pieces are put in the wind tunnel. This FIG. 5 shows the recovery ratio versus wind speed for three different wind tunnel height conditions as a function of the maximum size "d" of the foamed neat-insulating material pieces. In this figure, at the wind speed of 4.9 m/s, when the height of the wind tunnel is twice as much as the maximum size of the foamed heat-insulating material pieces, the recovery ratio is 96%; when it is 2.5 times, the recovery ratio is about 90%; and when it is 5 times, the recovery ratio is reduced to 55%. The result shows that the height of the tunnel is preferably set to be 2.5 times or less as much as the maximum size of the foamed heat-insulating material pieces. Since the maximum size of the foamed heat-insulating material pieces is about 60 mm, the height of the wind tunnel is preferably specified to be 150 mm or less.

Figure 6:
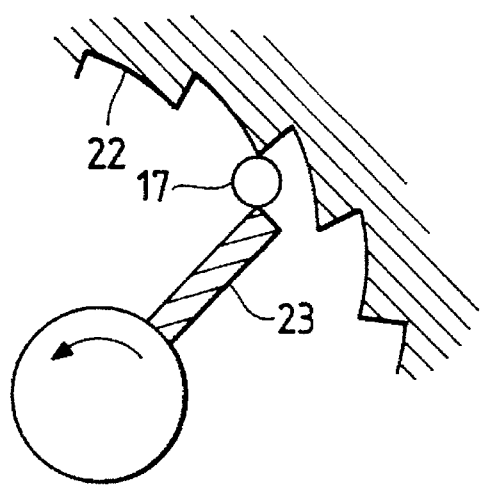
FIG. 6 is an enlarged sectional schematic view showing an important portion of a pulverizing portion of the recovery system of FIG. 1.

The foamed heat-insulating material pieces sorted in the wind force sorter described above pass through both a longitudinal hopper 18, having two rotary valves 19, and a screw feeder 20, as shown in FIG. 1, and are supplied to a pulverizer 21 in the subsequent process. The pulverizer is intended to degas the foaming gas, and it supplies a mixed gas of the degassed foaming gas and air put in the pulverizer together with the foamed heat-insulating material pieces, to a condenser 27. In this case, when the concentration of the foaming gas is high, a high condensing efficiency can be obtained. The above-noted rotary valves 19 prevent the degassed foaming gas from flowing backward and being leaked from the screen 12 or the like to the outside of the system. FIG. 6 shows an important portion of the pulverizer 21. The pulverizer 21 includes sawtooth fixed blades 22 and planar rotary blades 23. Each of the foamed heat-insulating material pieces 17 are pushed into a gap (about 1 to 2 mm) between the leading edge of a rotary blade 23 and a fixed blade 22, to be thus pulverized by the shearing force. In the case that the foamed heat-insulating material is a hard polyurethane foam, the velocity gradient corresponding to the shearing force acted at material piece 17, as defined by a division of a circumferential velocity of the leading edge of rotary blade 23 by a gap length, is required to be in the range of 1000/s (s=second) or more, preferably, in the range of 5000/s to 50000/s. In the example shown in FIG. 6, the necessary shearing force can be obtained by setting the rotational speed of the rotary blade at about 3000 rpm.

The pulverizer is not limited to the rotary type, and may be of a type capable of exerting a dynamic force to the heat-insulating material pieces. For example, there may be used an impact pulverizer including a pair of rotors having rotary blades around respective outer peripheries for exerting an impact force to the heat-insulating material pieces between the rotary blades.

Figure 7:
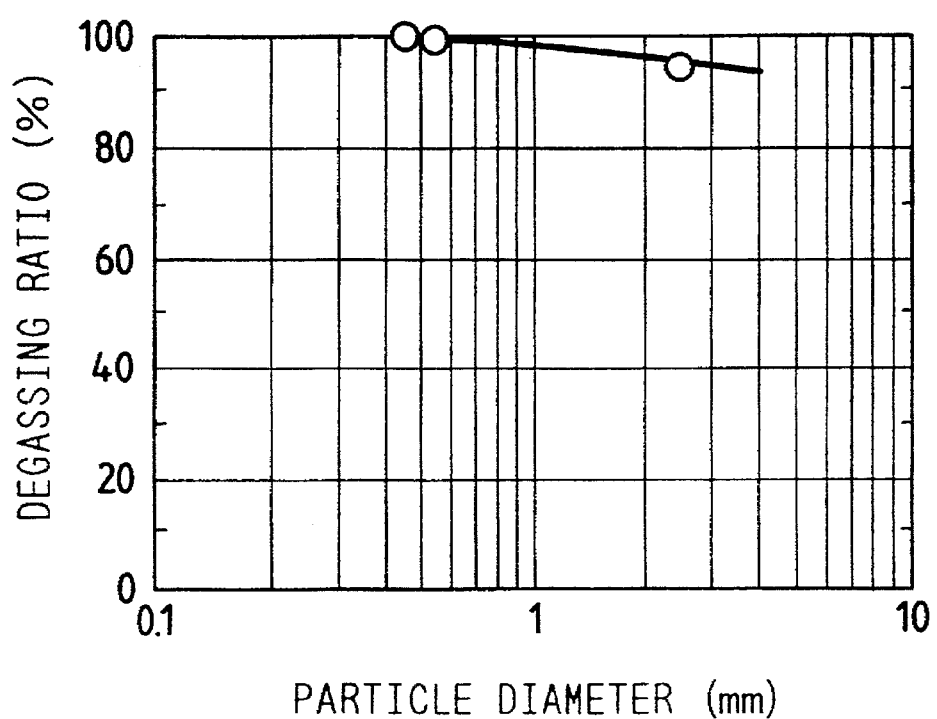
FIG. 7 is a graph showing a particle size and a degassing ratio for foamed heat-insulating material pieces after being pulverized by a pulverizer of the present invention.

FIG. 7 shows one relationship between the particle size of foamed heat-insulating material pieces after being pulverized using a pulverizer and a degassed foaming agent by the present inventors. As is apparent from this figure, when the foamed heat-insulating material pieces are pulverized up to the particle size of about 0.4 mm, that is, to the degree of the diameter of the independent foams in the foamed heat-insulating material pieces, the foaming agent is substantially perfectly degassed.

In addition, at a tank 24 and the screw feeder portion shown in FIG. 1, there is generated a pressure variable wave due to the impact caused by pulverization. The pressure variable wave is propagated to the hopper 18 described above, which causes the danger that the degassed foaming gas flows backward and is leaked to the outside of the system through the screen 12 of the wind force sorter. However, this flow-out of the degassed foaming gas is prevented because the foamed heat-insulating material pieces in the longitudinal hopper 18 serve as damping material, the rotary valves 19 extremely reduce the amplitude of the pressure variable wave, and the gas is absorbed by a compressor 26 described later.

The foaming gas generated in the pulverizer 21 passes through a bag filter 25 and is compressed by the compressor 26. This foaming gas is liquified by a condenser 27 and is then recovered in a collecting tank 28.

Figure 8:
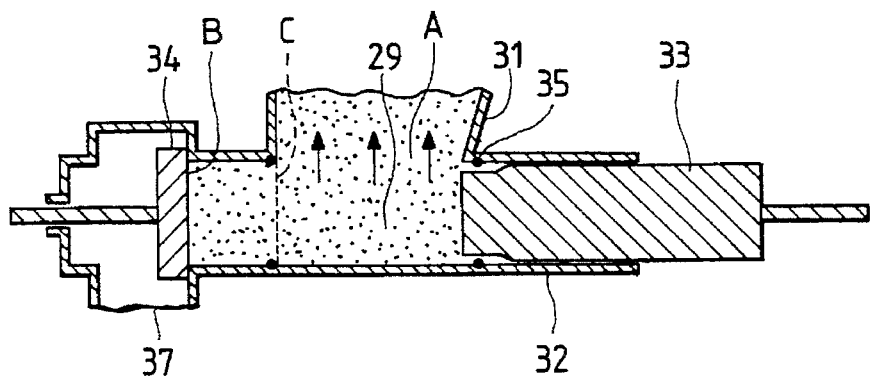
FIGS. 8 to 11 are sectional views of a cylinder, piston and the like for explaining the action of a compressor of the present invention.
Figure 9:
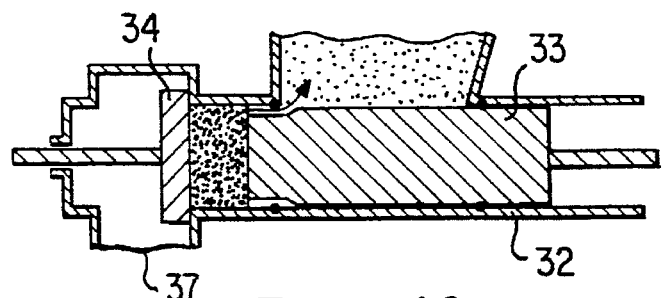
Figure 10:
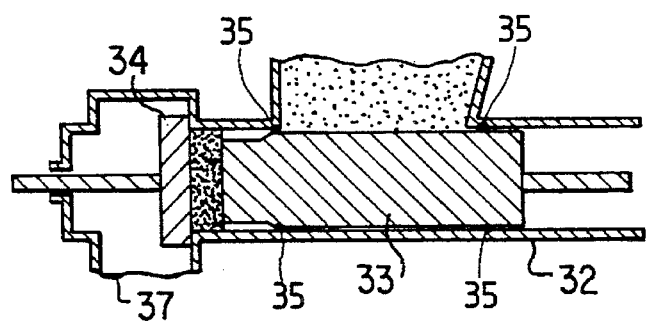
Figure 11:
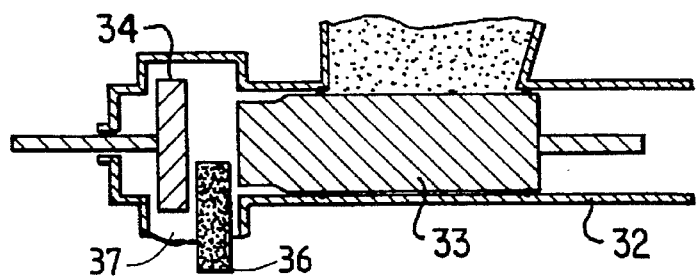

Next, a compressor 30 for compressing a fine powder 29 of resin material of the foamed heat-insulating material pieces pulverized in the pulverizer will be described with reference to FIGS. 8 to 12. In FIG. 8, numeral 31 indicates a hopper 31, 32 is a cylinder, 33 is a main drive piston with a straight cylinder portion longer in length than an opening portion A of the cylinder, 34 is a driven piston for receiving a reaction force when the main drive piston compresses the fine powder of the foamed heat-insulating material pieces. The fine powder of the foamed heat-insulating material pieces are charged by their deadweight into the cylinder 32 by way of the hopper 31. At this time, the driven piston 34 is contacted with the end surface of the cylinder at the point B. The drive piston 33 is moved leftward to compress the fine powder while discharging the foaming gas present in gaps within the fine powder upward on the hopper side as shown by the arrows until the leading edge of the drive piston 33 passes through the opening portion (broken line C). After that, as shown in FIG. 9, since the diameter of the leading edge of the drive piston 33 is slightly reduced, the foaming gas is discharged into the hopper 31 as shown by the arrows. Thus, as shown in FIG. 10, when the drive piston 33 is sealed by a sealing material 35 such as an o-ring, the compression is completed. Next, as shown in FIG. 11, the drive piston 33 and the driven piston 34 are simultaneously moved rightward, to discharge the fine powder of the compressed foamed heat-insulating material pieces from the discharge port 37 to the outside of the system.

Figure 12:
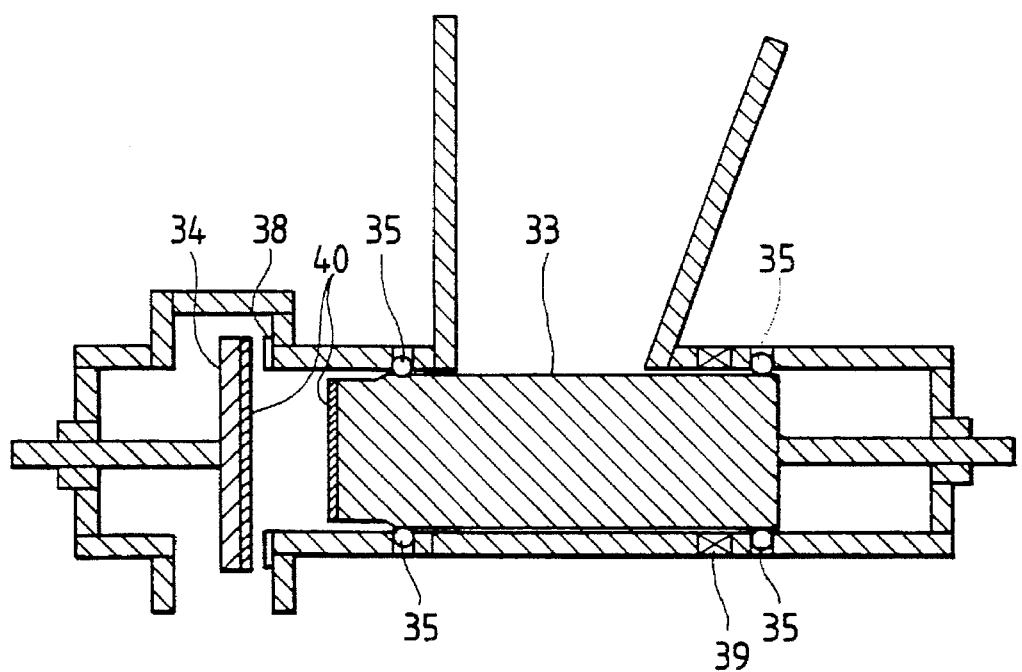
FIG. 12 is an enlarged detailed sectional view of FIG. 11.

FIG. 12 shows further details of the compressor. The leakage of the foaming gas can be prevented by the sealing material 35, a packing 38 and a dust sealing material 39. Moreover, when the compressed foamed heat-insulating material is discharged, it can be easily separated from the piston by bonding a sticking preventive material 40 such as fluoride resin or the like on the end surface of the piston.

In certain preferred embodiments, foaming gas which is not liquified in the condenser is recirculated into pulverizer 21 as schematically shown by dotted line 27A in FIG. 1. This recirculated gas can assist in cooling the pulverizer and in increasing the recovery ratio of the foaming gas.

Figure 13:
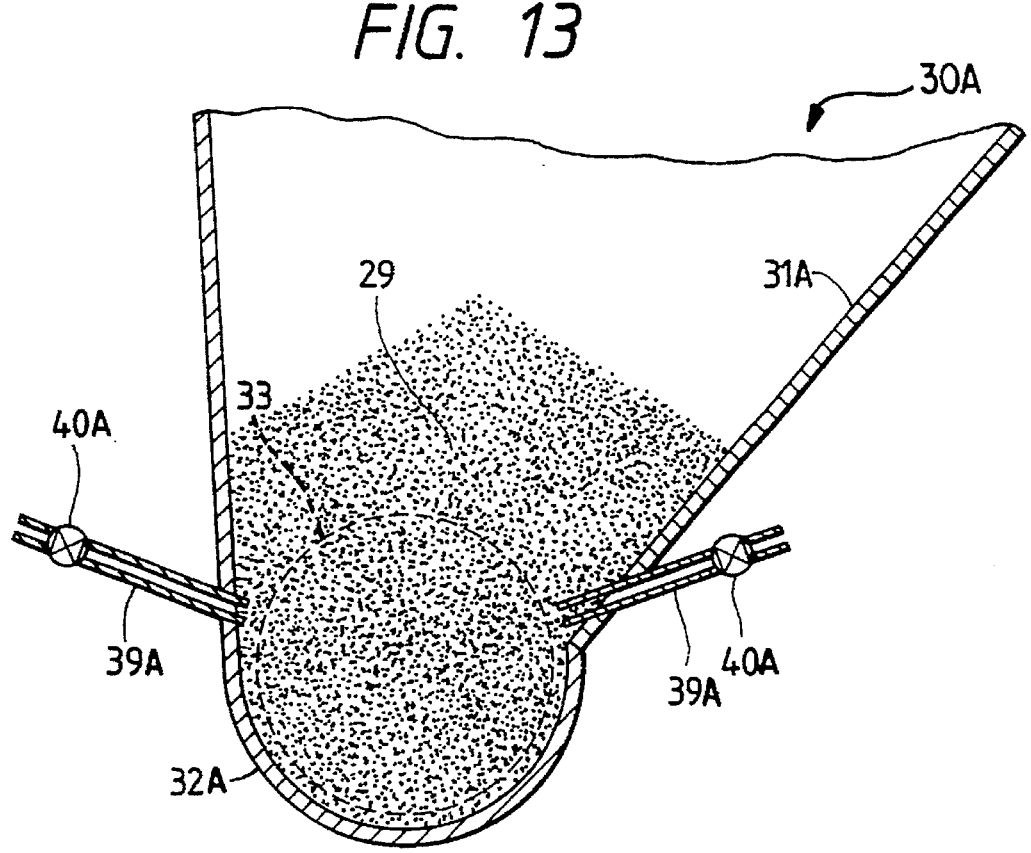
FIG. 13 is an enlarged sectional view of FIG. 11 for explaining the operation of the compressor of FIGS. 8–12.

The following is a description of a second embodiment of a compressor 30A as shown in the sectional view of FIG. 13. Other than as noted below with respect to the air nozzles 39A and valves 40A, this compressor is similar to the compressor 30 of the embodiment of FIGS. 1–12. When the fine powder of the foamed heat-insulating material is compressed by the compressor shown in FIG. 1, a mixed gas of a foaming gas and air in a slight amount is present in gaps within the fine powder, which is discharged to the outside of the system as it is. The formation of the gaps is dependent on the compressed load of the piston. Accordingly, as the concentration of the foaming gas is lowered for the same compressed load, the foaming gas discharged to the outside of the system can be reduced. In the embodiment of FIG. 13, air is blown in the compressor 30A from the outside, to lower the concentration of the foaming gas contained in the fine powder of the foamed heat-insulating material, thereby reducing the discharged foaming gas. FIG. 13 shows nozzles 39A having valves 40A for blowing air in the fine powder 29A within the cylinder 32A.

Other than this modified compressor with a supply of air to the fine powder as shown in FIG. 13, this second embodiment is similar to the embodiment of FIGS. 1–12.

Figure 14:
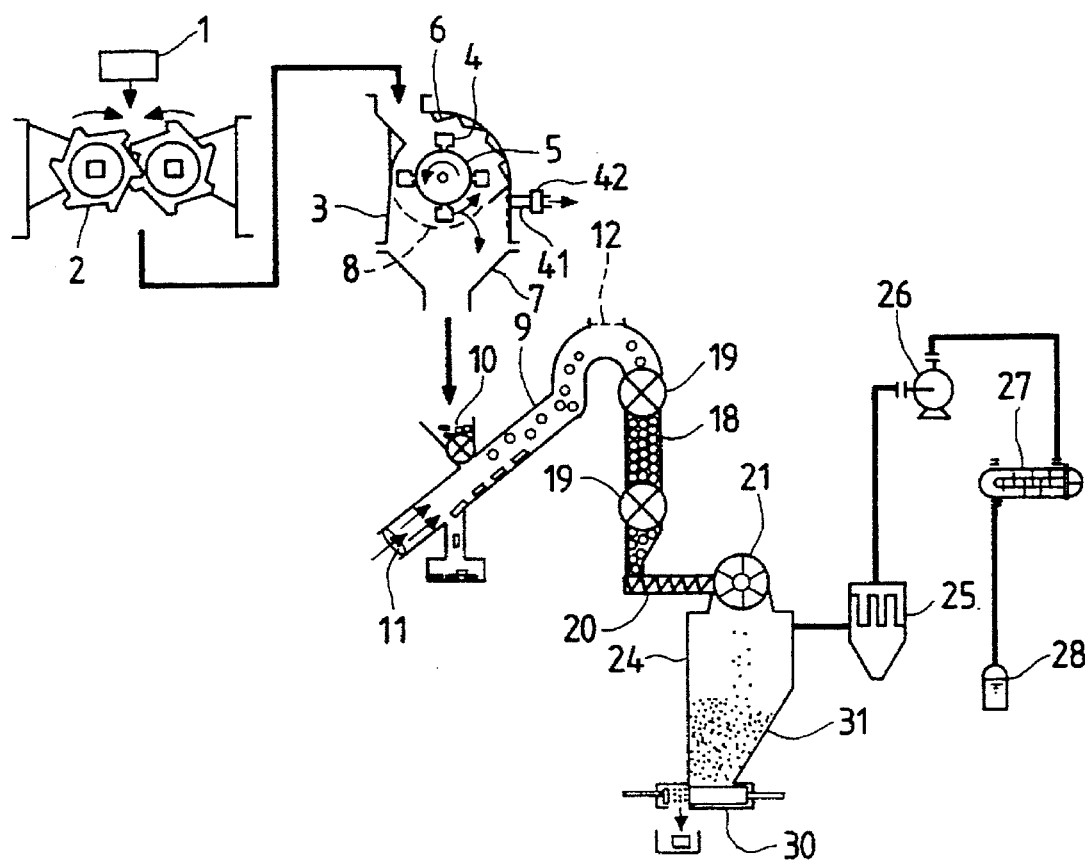
FIG. 14 is a schematic illustration showing the structure of a recovery system constructed according to another embodiment of the invention.

FIG. 14 shows a third embodiment of the invention. This embodiment is similar to the FIG. 1 embodiment except the crusher 3 is provided with a discharge port 41 and an absorbing agent 42. When being peeled, the foamed heat-insulating material is partially crushed with consequent release of foaming gas. The foaming gas thus degassed is absorbed by the absorbing agent 42 through the discharge port 41. Also, by heating the absorbing agent 42 with a specified interval, it is possible to furthermore enhance the recovery ratio of the foaming gas. Since the remainder of this embodiment of FIG. 14 is similar to the embodiment of FIG. 1, further details are included with the above description of FIG. 1.

According to the present invention, it is possible to easily and highly effectively separate a foamed heat-insulating material into a foaming gas and a heat-insulating resin without any alteration, and to recover them with high recovery ratios respectively.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for recovering foaming gas from fragments containing foamed material attached to solid materials, comprising the following sequentially arranged devices:

a first crusher with relatively movable parts receiving the fragments, said first crusher outputs foaming gas from the foamed material and a mixture of crushed foam material and crushed other materials;

separate outlets leading from the first crusher for the foaming gas and the mixture, a separator receiving the mixture, said separator outputs separate supplies of crushed foam material and crushed other materials; and a recovery device receiving the crushed foam material, said recovery device outputs a recovered foaming gas.

2. Apparatus according to claim 1, wherein said fragments are insulating parts of a used refrigeration system with said other solid material being plastic or metal plates and with said foamed materials being insulation attached to said plates, and wherein said first crusher device includes relatively movable first crusher device parts for peeling the foamed material from the plates while crushing said foamed material and said plates.

3. Apparatus for recovering foaming gas and other materials from fragments containing foamed material attached to other solid material, comprising the following sequentially arranged devices:

a first crusher having relatively movable parts engageable with said fragments to crush the fragments while peeling the foamed material from the other solid material, whereby a mixture of crushed foam material and crushed other solid material is formed, a mixture separator, a second crusher operable on a supply of said crushed foam material from the mixture separator to destroy independent foams in said foam material and separate same into a fine powder resin component and a foaming gas, said second crusher having relatively movable parts engageable with said crushed foam material; and a foaming gas cooler which forms a liquified foaming agent from the foaming gas.

4. Apparatus according to claim 3, comprising a powder compressing device.

5. Apparatus according to claim 4, wherein said compressing device includes:

a cylinder having an opening portion on a side surface;

a main drive piston with a straight barrel portion having a length longer than that of the opening portion in the axial direction of the cylinder; and a driven piston with a straight barrel portion having a length shorter than that of the main drive piston, the main drive piston and the driven piston being disposed on opposite ends of the cylinder with the opening portion therebetween, wherein the fine powder component charged from the opening portion is compressed by movement of the main drive piston on the drive piston side, and at the same time the opening portion of the cylinder is closed by a straight barrel portion of the moved main drive piston, and the compressed fine powder is discharged from an end surface of the cylinder on the drive piston side by movement of the main drive piston and the drive piston on the driven piston side.

6. Apparatus according to claim 5, wherein the mixture separator is a tilting type wind force sorting conveyor unit with wind force conveying of the foamed material to an upper conveyor outlet opening while said other material is conveyed downwardly by gravity along a downwardly sloped bottom surface of the conveyor unit to a lower conveyor outlet opening.

7. Apparatus according to claim 6, wherein said first crusher movable parts include a high speed rotor having a plurality of hammers and a crusher casing having an irregular shaped inner wall surface, said hammers and irregular shaped inner wall surface cooperating to crush said fragment and peel the foamed material from the other solid materials.

8. Apparatus according to claim 1, wherein a hopper is provided downstream of the separator, and wherein at least two rotary valves are provided for selectively isolating the hopper to thereby accommodate temporary storage of said foamed materials.

9. Apparatus according to claim 3, wherein a hopper is provided downstream of the mixture separator, and wherein at least two rotary valves are provided for selectively isolating the hopper to thereby accommodate temporary storage of said foamed materials.

10. Apparatus according to claim 6, wherein a hopper is provided downstream of the mixture separator, and wherein at least two rotary valves are provided for selectively isolating the hopper to thereby accommodate temporary storage of said foamed materials.

11. Apparatus according to claim 7, wherein a hopper is provided downstream of the mixture separator, and wherein at least two rotary valves are provided for selectively isolating the hopper to thereby accommodate temporary storage of said foamed materials.

12. Apparatus according to claim 1, wherein said recovery device includes:

a second crusher operable on a supply of said crushed foam material from the separator to destroy independent foams in said foam material and separate same into a fine powder resin component and a foaming gas, said second crusher have relatively movable parts engageable with said crushed foam material; and a foaming gas cooler which forms a liguified foaming agent from the foaming gas.

13. Apparatus according to claim 12, wherein said recovery device comprises a powder compressing device including:

a cylinder having an opening portion on a side surface;

a main drive piston with a straight barrel portion having a length longer than that of the opening portion in the axial direction of the cylinder; and a driven piston with a straight barrel portion having a length shorter than that of the main drive piston, the main drive piston and the driven piston being disposed on opposite ends of the cylinder with the opening portion therebetween, wherein the fine powder component charged from the opening portion is compressed by movement of the main drive piston on the drive piston side, and at the same time the opening portion of the cylinder is closed by a straight barrel portion of the moved main drive piston, and the compressed fine powder is discharged from an end surface of the cylinder on the drive piston side by movement of the main drive piston and the drive piston on the driven piston side.

14. Apparatus according to claim 1, wherein said separator is a tilting type wind force sorting conveyor unit with wind force conveying of the foamed material to an upper conveyor outlet opening while said other material is conveyed downwardly by gravity along a downwardly sloped bottom surface of the conveyor unit to a lower conveyor outlet opening.

15. Apparatus according to claim 13, wherein said separator is a tilting type wind force sorting conveyor unit with wind force conveying of the foamed material to an upper conveyor outlet opening while said other material is conveyed downwardly by gravity along a downwardly sloped bottom surface of the conveyor unit to a lower conveyor outlet opening.

16. Apparatus according to claim 1, wherein said first crusher includes relatively movable parts engageable with said fragments to crush the fragments while peeling foamed material from the solid materials.

17. Apparatus according to claim 15, wherein said first crusher includes relatively movable parts engageable with said fragments to crush the fragments while peeling foamed material from the solid materials.

18. Apparatus according to claim 16, wherein said relatively movable parts of said first crusher include a high speed rotor having a plurality of hammers and a crusher casing having an irregular shaped inner wall surface, said hammers and irregular shaped inner wall surface cooperating to crush said fragment and peel the foamed material from the other solid materials.

19. Apparatus according to claim 14, wherein said wind force sorting conveyor unit includes a conveying wind tunnel section which exhibits a maximum cross-sectional height of approximately 2.5 times the maximum particle size of the crushed foamed material conveyed therein.

20. Apparatus according to claim 19, wherein said maximum cross-sectional height is 150 mm.

21. Apparatus according to claim 5, wherein said compressing device includes a gap formed between a leading edge portion of said main drive piston and said cylinder for discharging foaming gas contained in the fine powder on the opening portion side after the leading edge of said piston passes through the opening portion of said cylinder.

22. Apparatus according to claim 5, wherein said compressing device has a structure with a sticking preventive material bonded on at least one of the end surfaces of said main drive piston and said driven piston which are contacted with the fine powder of said foamed heat-insulating material.

23. Apparatus according to claim 5, wherein said compressing device has a structure providing for injection of gas from the outside in said cylinder through a portion provided on or near a side surface of said cylinder.

24. Apparatus according to claim 1, wherein a plurality of openings are provided in a discharge part of said first crusher for defining an upper limit of the size of crushed pieces discharged from the first crusher.

25. Apparatus according to claim 1, comprising a gas suction port and a gas absorbing portion at the first crusher for absorbing foaming gas contained in said first crusher.

26. Apparatus according to claim 1, wherein said recovery device includes a pulverizer section for separating the crushed foam material into a resin component and a foaming gas,
and wherein recirculating means are provided for recirculating a portion of the foaming gas back into the pulverizer section to thereby increase the concentration of foaming gas.

27. Apparatus according to claim 3, comprising recirculating means for recirculating a portion of the foaming gas from the outlet of the second crusher back into an inlet to the second crusher to thereby increase the concentration of foaming gas.

28. Apparatus according to claim 7, comprising recirculating means for recirculating a portion of the foaming gas from the outlet of the second crusher back into an inlet to the second crusher to thereby increase the concentration of foaming gas.

29. Apparatus according to claim 14, wherein said wind force sorting conveyor unit includes first and second other material outlet openings disposed at different vertical heights along the bottom surface thereof for effecting further separation of the other materials as a function of their density and sliding surface friction coefficient.

30. A method for recovering foaming gas and other materials from fragments containing foamed material attached to other solid materials, comprising the following sequential steps:
first crushing the fragment while peeling the foamed material from the other solid material to form a mixture of crushed foam material and crushed other materials;
separating the mixture into separate supplies of crushed foam material and crushed other material; and
recovering foaming gas from the separate supply of crushed foam material.

31. A method according to claim 30, wherein said fragments are insulating parts of a used refrigeration system with said other solid material being plastic or metal plates and with said foamed materials being insulation attached to said plates, and wherein said first crushing includes movement of relatively movable first crusher parts for peeling the foamed material from the plates while crushing said foamed material and said plates.

32. A method according to claim 30, wherein said recovering includes:
further crushing said crushed foam material in a second crusher to thereby destroy independent foams in said foam material and separate same into a fine powder resin component and a foaming gas; and
cooling said foaming gas to form a liquified foaming agent.

33. A method according to claim 32, wherein said recovering includes compressing said powder to form a block of powder.

34. A method according to claim 33, wherein said compressing is carried out in a compressor including:
a cylinder having an opening portion on a side surface;
a main drive piston with a straight barrel portion having a length longer than that of the opening portion in the axial direction of the cylinder; and
a driven piston with a straight barrel portion having a length shorter than that of the main drive piston,
the main drive piston and the driven piston being disposed on opposite ends of the cylinder with the opening portion therebetween,
wherein the fine powder component charged from the opening portion is compressed by movement of the main drive piston on the drive piston side, and at the same time the opening portion of the cylinder is closed by a straight barrel portion of the moved main drive piston, and the compressed fine powder is discharged from an end surface of the cylinder on the drive piston side by movement of the main drive piston and the drive piston on the driven piston side.

35. A method according to claim 30, wherein the separating includes use of a separator device which is a tilting type wind force sorting conveyor unit with wind force conveying of the foamed material to an upper conveyor outlet opening while said other material is conveyed downwardly by gravity along a downwardly sloping bottom surface of the conveyor unit to a lower conveyor outlet opening.

36. A method according to claim 34, wherein the separating includes use of a separator device which is a tilting type wind force sorting conveyor unit with wind force conveying of the foamed material to an upper conveyor outlet opening while said other material is conveyed downwardly by gravity along a downwardly sloping bottom surface of the conveyor unit to a lower conveyor outlet opening.

37. A method according to claim 30, wherein said first crushing includes use of a first crusher device which includes a high speed rotor having a plurality of hammers and a crusher casing having an irregular shaped inner wall surface, said hammers and irregular shaped inner wall surface cooperating to crush said fragment and peel the foamed material from the other solid materials.

38. A method according to claim 30, comprising use of a gas suction part and gas absorbing portion at the first crusher device for absorbing foaming gas contained in said first crusher device.

39. A method according to claim 30, wherein said recovering includes use of a pulverizer section for separating the crushed foam material into a resin component and a foaming gas, comprising recirculating a portion of the foaming gas back into the pulverizer section to thereby increase the concentration of foaming gas.

40. A method according to claim 32, comprising recirculating a portion of the foaming gas from the outlet of the second crusher back into an inlet to the second crusher to thereby increase the concentration of foaming gas.

41. A method for separating a foamed material and another material which are adhered with each other comprising the steps of:

providing an article having said foamed material and another material which are adhered with each other;

applying an impact to said article by a movable rigid member;

pressing said article against a fixed rigid member by said movable rigid member to cause a shearing force acting on said article to thereby peel said foamed material away from said another material; and moving said article in a condition of being pressed into a space free from a pressing force.

42. A method according to claim 41, wherein a velocity gradient of said shearing force in the step of pressing exceeds 1000/second.

43. A method according to claim 41, wherein a velocity gradient of said shearing force in the step of pressing is a value between 5000/second and 50000/second.

* * * * *